(No Model.) 4 Sheets—Sheet 1.
P. DICKINSON.
SEED PLANTER.
No. 339,978. Patented Apr. 13, 1886.
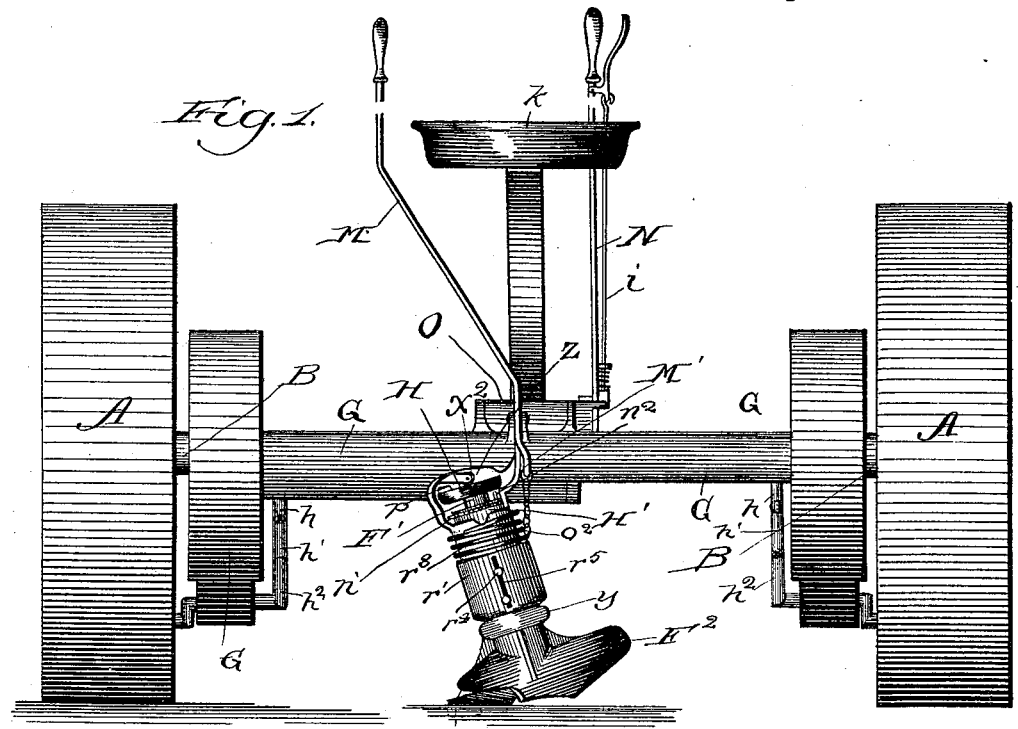
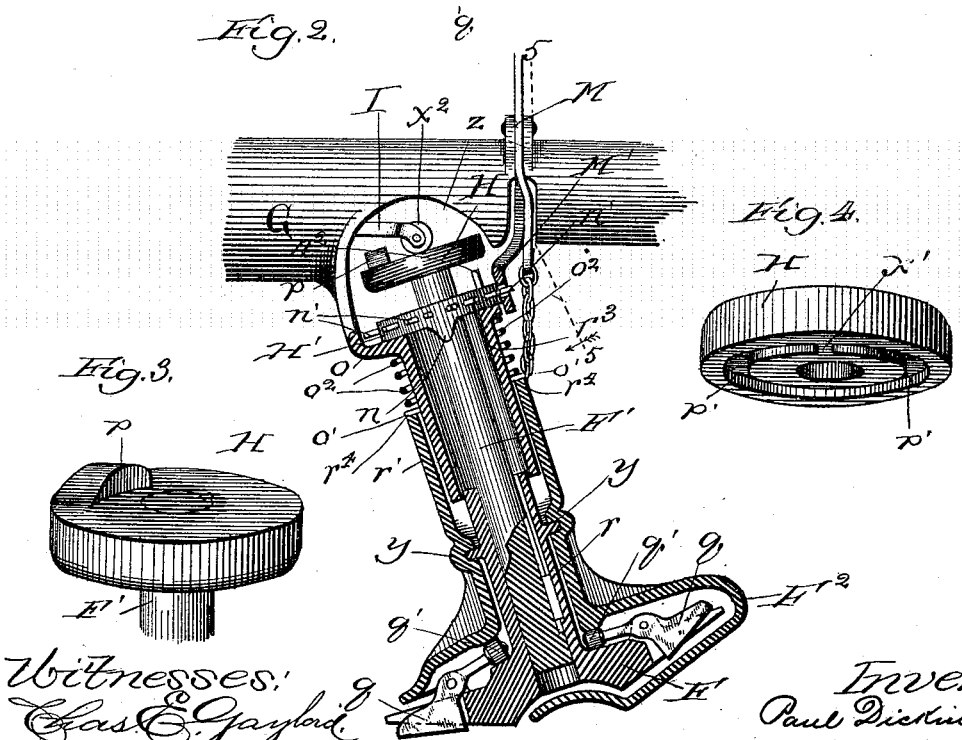
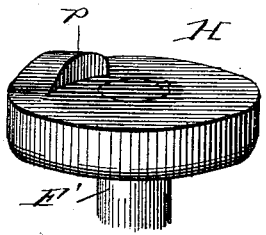
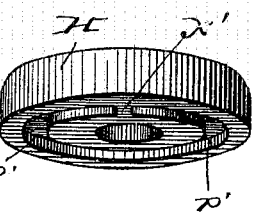
Witnesses:
Chas. E. Gaylord
Mason Brass
Inventor:
Paul Dickinson,
By Dyrenforth & Dyrenforth
Attys (No Model.) 4 Sheets—Sheet 2.
P. DICKINSON.
SEED PLANTER.
No. 339,978. Patented Apr. 13, 1886.
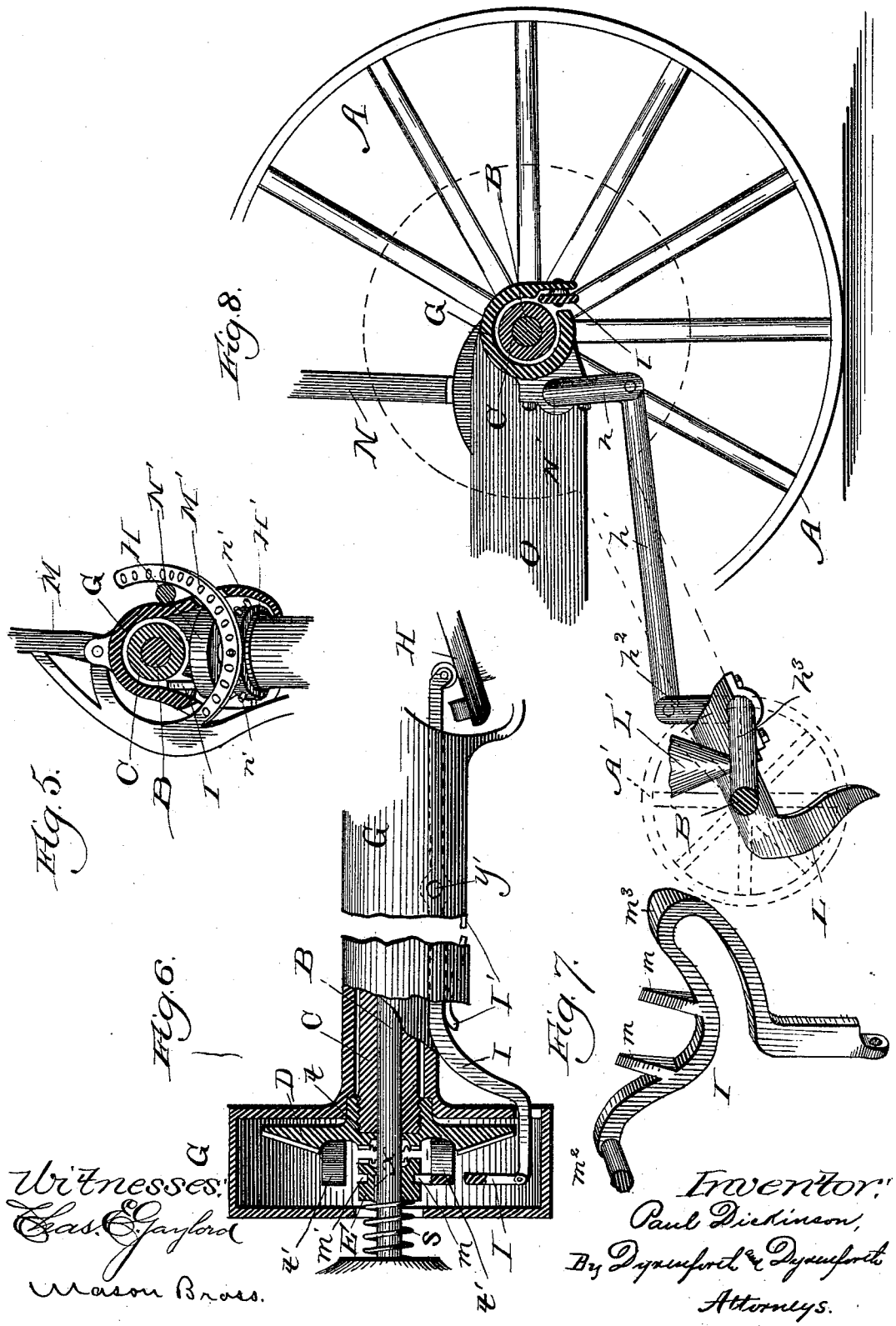

(No Model.) 4 Sheets—Sheet 3.
P. DICKINSON.
SEED PLANTER.
No. 339,978. Patented Apr. 13, 1886.
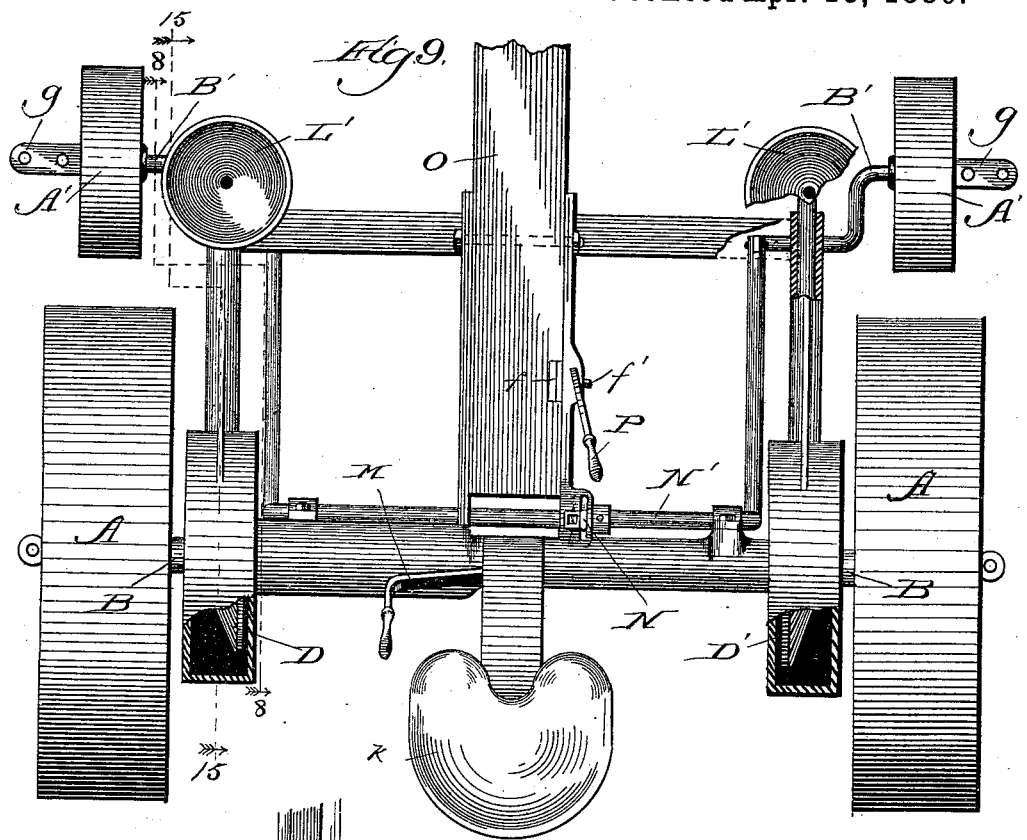
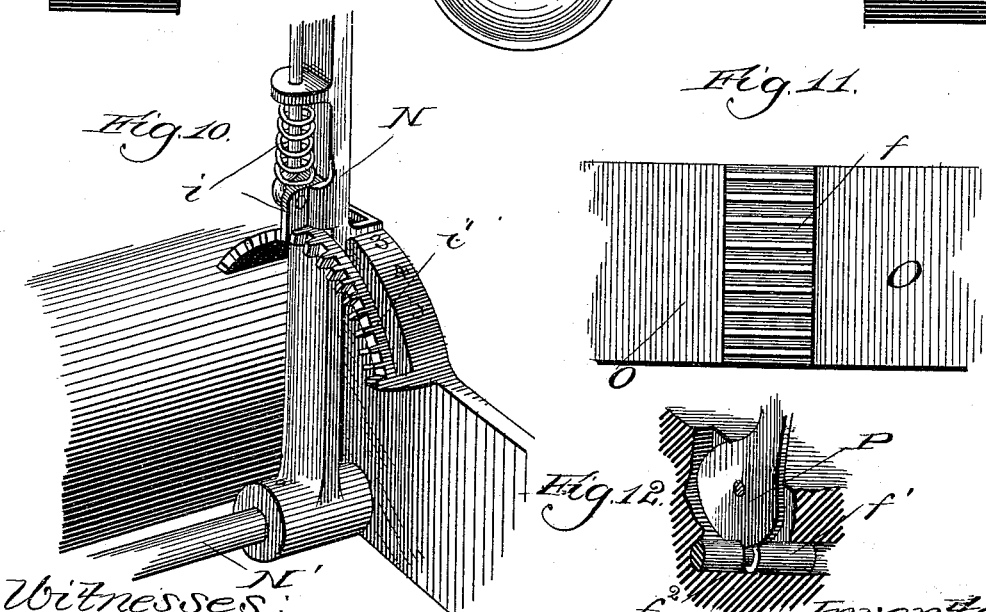
Witnesses:
Chas. E. Gaylord.
Mason Brass.
Inventor:
Paul Dickinson
By Dyrenforth & Dyrenforth,
Attys.

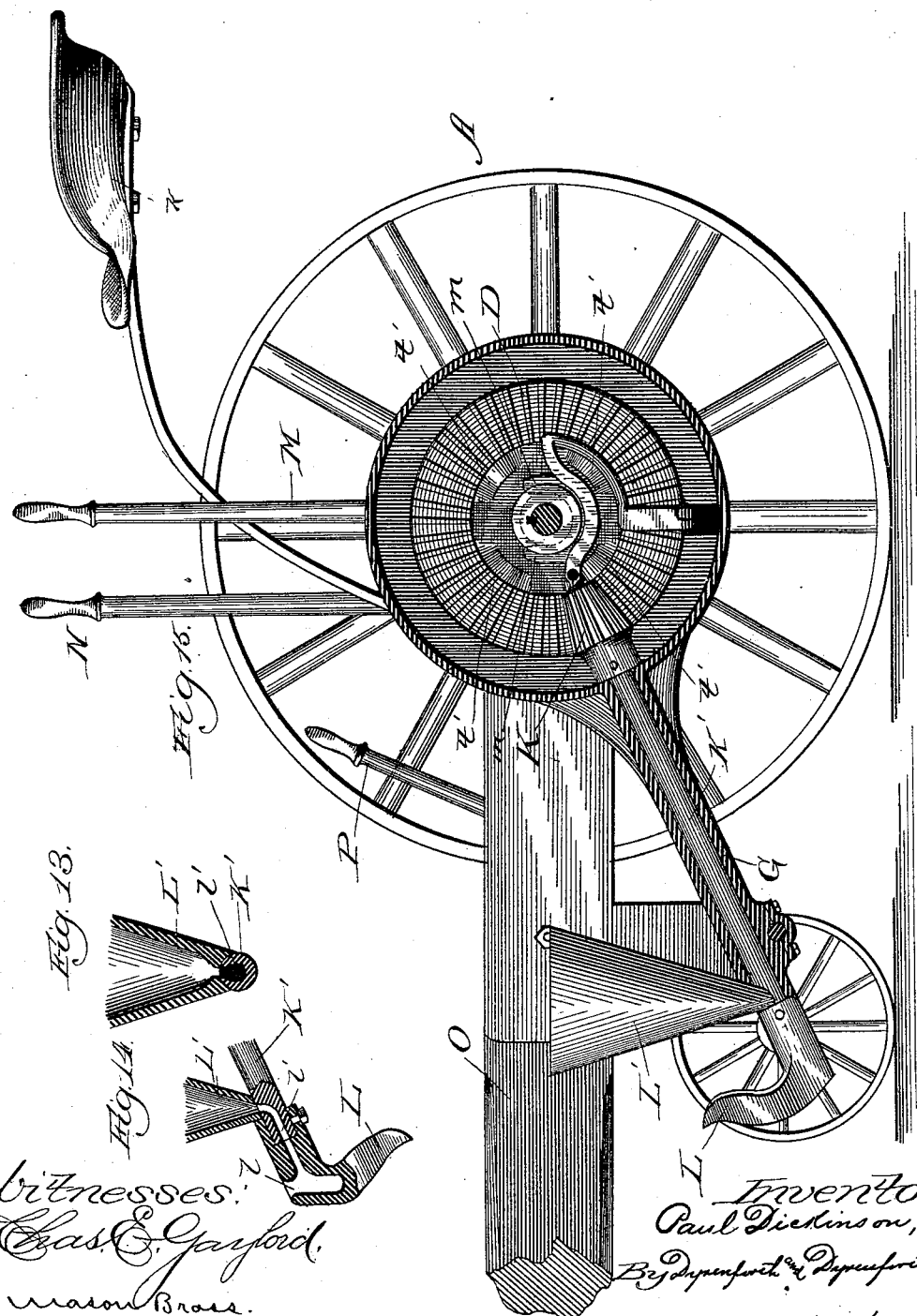

UNITED STATES PATENT OFFICE.

PAUL DICKINSON, OF CHICAGO, ILLINOIS.

SEED-PLANTER.

SPECIFICATION forming part of Letters Patent No. 339,978, dated April 13, 1886.

Application filed December 8, 1885. Serial No. 185,042. (No model.)

*To all whom it may concern:*

Be it known that I, PAUL DICKINSON, a citizen of the United States, residing at Chicago, in the county of Cook and State of Illinois, have invented a certain new and Improved Seed-Planter; and I hereby declare the following to be a full, clear, and exact description of the same.

My invention relates to the class of seed-planters in which the movement of the machine causes the operation of planting to be accomplished automatically at points in the route of the machine the distance apart considered to be proper for the planting—say about three feet in each direction of the sides of a square, as corn, for example, is quite commonly planted. One way, and the most common, for causing the automatic planting to take place at the desired points is practiced by the employment, for the purpose, of check-rowers; and many such devices have been invented and patented and commonly used for the lack of a better contrivance for the purpose, though even in its best form it requires manipulation which entails annoyance and trouble that render it objectionable.

Various contrivances have been invented and tried which were constructed to avoid the necessity of the employment of check-rowers, by causing the planting to take place automatically at desired points or intervals by the revolution of the drive-wheels of the machine; but such devices have, so far as I am aware, been found to be impracticable, owing to their operation upon an inapplicable principle— viz., that of actuation from the drive-wheels in their rotation, since the points of depositing the seed in planting cannot thereby be appointed at uniform distance apart or intervals—a most necessary condition in this connection—for the reason that the circumferences of the drive-wheels are constantly being changed in their extent by the accumulation upon them and removal from them, in their motion, of the soil upon which they run.

It is my object to provide a seed-planter which shall operate reliably and automatically by its movement to plant at points the required distance apart without the use of check-rowers and without relation in its operation to the extent of circumference of the drive-wheels.

To this end my invention consists in a flat wheel upon the seed-planter, normally in contact with the ground and rotated by the locomotion of the machine, and connected with mechanism which, by the rotation of the flat wheel, it operates to actuate at the proper times and places to effect the planting.

My invention also consists in the general construction of my improved machine; and it further consists in certain details and combinations of parts, all as hereinafter more fully set forth.

Referring to the drawings, Figure 1 represents a rear elevation of my improved machine in the form of a corn-planter, with the flat or trip wheel in operative position; Fig. 2, an enlarged sectional view of the flat-wheel device in operative position, showing its construction in detail; Fig. 3, a perspective view of a detail forming the cam-disk on the shaft of the flat wheel; Fig. 4, a similar view of the same detail, showing the construction of its lower surface presented by the view; Fig. 5, a sectional view on the line 5 5 of Fig. 2, showing in detail the construction of the mechanism for raising the flat-wheel device from contact with the ground and for effecting proper adjustment of the parts to cause timely action of the planting mechanism actuated by the rotation of the flat wheel whenever the latter shall be lowered from its raised position; Fig. 6, a view partly in section, showing the jointed lever actuated by the cam-disk on the head of the shaft of the flat wheel to release a clutch-block, to permit its engagement with a clutch on a beveled gear-wheel, which is thereby caused to rotate and effect the planting; Fig. 7, a perspective view of a portion of the tripping-lever; Fig 8, a sectional side elevation of the machine, showing the immediate planting mechanism and means for gaging the depth of its penetration into the soil, the section being taken on the line 8 8, Fig. 9; Fig. 9, a plan view, partly in section, of the machine, having a portion of the tongue removed; Fig. 10, a perspective view of a detail; Fig. 11, a side elevation of a portion of the tongue provided with a rack; Fig. 12, a perspective view of a detail comprising a cam device and pin to render the tongue rigid or swinging; Fig. 13, a sectional view of the seed-box; Fig. 14, a similar view of the scoop having the seed-box connected with it, and Fig. 15 a sectional elevation taken on the line 15 15 of Fig. 9.

As is common with machines of the present nature, the drive-wheels A may be secured upon the axle B to revolve with the latter only when the machine is moved in a forward direction, and the usual mechanism is employed to produce this result. The main axle B is surrounded by a sleeve, C, (see Fig. 6,) which carries upon opposite extremities and surrounding the axle beveled gear-wheels D and D', the one D of which is provided with lugs or cams $t'$, (four in number,) and centrally around the axle with clutch-teeth $t$, to be engaged in the manner hereinafter described by a clutch-block, E, arranged upon the axle to slide longitudinally thereon, but caused to revolve with it by means of a feather, $x$, all as clearly shown in Fig. 6, and a tendency of the clutch-block E to engage with the teeth $t$ on the gear-wheel D is maintained by a spring, $s$, upon the axle, confined between the clutch-block and hub of the adjacent wheel A, or other suitable stop.

F is a so-called "flat wheel," disk-shaped upon its upper surface around a flanged sleeve, $r$, integral with the wheel portion, and having extending through its center and through the sleeve $r$ a shaft, F', (see Fig. 2,) which rotates with the wheel F by means of a feather, as shown, though the wheel has a sliding upward and downward movement upon the shaft. The lower surface of the flat wheel is beveled in an upward and outward direction from around its center, and lies in contact with or relation to the ground in an oblique position, whereby only a small part of its surface toward its periphery can at once have such contact, and it is slotted radially toward its periphery to receive pivoted shoes $q$, provided with friction-rollers $q'$ toward their inner extremities, which serve a purpose hereinafter described.

The wheel F is provided with a housing, F², in which it rotates, and which is open on one side, to permit contact at such opening with the ground of the beveled surface of the wheel and the penetration into the soil to insure rotation of a coincident shoe, $q$, and the housing F² has an extension or sleeve, $r'$, recessed, as shown at $y$, to receive the flange on the extension or sleeve $r$, and surrounds the obliquely downward projecting part or sleeve, $r^3$ of the frame G, provided with projections or guides $r^4$, to enter slots $r^5$ in the sleeve $r'$, as shown in Fig. 1, the sleeve $r^3$ opening into an archway or housing, Z, in which is contained the disk or head H, rigid upon the upper end of the shaft F', and provided with a lug or cam, $p$, on its upper surface, and a circular recess, $p'$, (see Fig. 4,) on its under surface, but extending only part way around it, to afford an abutment, $x'$, at each end, which serves a purpose hereinafter described. A loose collar, H', surrounds the shaft F' below the disk H, having its seat upon a shoulder, $o$, below the housing Z, or at the upper end of the sleeve $r^3$, and is provided with a cam, $n$, on its lower surface, with peripheral teeth or projections $n'$, and with a projection, $n^2$, Fig. 2, on its upper surface, to enter, when the collar H' is raised, as hereinafter described, the recess $p'$ in the lower surface of the disk H.

Confined between the shoulder $o$ and a flange or ring, $o'$, upon the end of the sleeve $r'$, is a spring, $o^2$, against the resistance of which the flat wheel is raised upon the shaft F' from the ground, in the manner and for the purpose hereinafter described, and which affords a yielding nature to the flat wheel to permit it to conform to unevenness on the surface of the ground. A lever, I, of peculiar form extends from a point adjacent to the head H, where it is provided with a friction-roller, $x^2$, along the frame G of the machine, to which it is fulcrumed, as shown at $y'$, Fig. 6, and is provided with a spring, I', on the side of the pivotal point, where it will tend to maintain the roller $x^2$ in contact with the disk H. Toward its opposite end the lever I is jointed and bent, as shown in Fig. 6, to clear the beveled gear-wheel D, and rises toward the clutch-block E, where it is bent, as shown in Fig. 7, and provided with a lug, $m^3$, with wedge-shaped projections $m$, which enter a recess, $m'$, formed around the clutch-block, and a pivot, $m^2$, at its extremity, provided with a ball-joint, the socket for which is shown in Fig. 15, connects it loosely in the frame G, whereby it may move laterally as well as in a vertical plane.

K (see Fig. 15) is a beveled pinion, one of which is provided on each side of the machine in mesh with the beveled gear-wheels D and D', and on the end of a shaft, K', supported in the frame work G of the machine and extending in a forward direction obliquely downward toward the surface of the ground, and provided at its extremity with a scoop or spade, L, somewhat spiral in form, and having a seed-receptacle, $l$, which opens at or near the base or heel of the scoop L, and communicates with the seed-box L', secured in position on the frame-work of the machine, through an opening, $l'$, in the end of the shaft K'.

In the rotation of the shafts K', as hereinafter described, they maintain closed the openings in the lower ends of the seed-boxes, but permit the chambers $l$ to be filled with seed whenever the openings $l'$ coincide with the openings in the lower ends of the seed-boxes.

The automatic operation of planting is accomplished in the following manner: Assuming the required intervals between the rows to be three feet, whereby the points of planting shall be at the four corners of a square for each run of the machine, the gear-wheels D D' are located in their respective positions about three feet apart, and the circumference of the flat wheel F is also three feet. As the machine is moved forward, the contact of the flat wheel with the ground causes it to rotate, and the penetration into the soil of each shoe $q$ as it reaches the opening in the housing F² insures such rotation, by the continuation of which the confinement of the friction-wheels $q'$ between the housing and upper surface of the flat wheel serves to raise them out of the soil and permit their entrance into the housing, each to operate in the same way when it reaches the opening in the housing in the course of rotation of the flat wheel, and the edges of the housing encountered by the periphery of the flat wheel serve to scrape off the soil that sticks to the surface of the same from its contact with the ground.

At the end of each revolution of the flat wheel F the lug or cam $p$ on the disk or head H will strike the adjacent end of the lever I, thus lowering it at its opposite end, bringing the lug $m^3$ away from the cams $t'$, and rendering the clutch E free to be forced by the resilience of the spring $s$ into mesh with the teeth $t$ on the beveled gear-wheel D, since the tapered ends only of the guide projections $m$ will remain in the recess of the clutch-block, and thus obviously permit such movement. As the clutch-block E revolves with the axle B, the motion of the latter will then be communicated to the gear-wheel D, sleeve C, and gear-wheel D', and the movement of these gear-wheels operates to revolve the pinions K in mesh with them, the gearing and other parts being so arranged and constructed to permit each tripping of the lever I to cause the pinions K to make each a complete revolution, and the points of the scoops L, the scoops being three feet apart, will remove soil, the contents of the chambers $l$ therein, which chambers have flaring ends, will be emptied into the excavations, and the latter will be refilled and the seed covered over by the earth which slides from the scoops during the completion of their rotation, the outlet of the seed-box being closed, as hereinbefore stated, by the shafts K' during their rotation. It will thus be seen that at each three feet of forward movement of the machine two deposits of seed into the soil will be made at points three feet apart.

Upon the clearance of the cam or lug $p$ by the lever I, the tendency of its jointed bent end, assisted by the spring I' and the pressure of an adjacent cam, $t'$, against the lug $m^3$ on the lever, which presses it backward, will be to rise, and it will enter the recess in the clutch-block E, into which it is guided by the wedge-shaped guide projections $m$, which are never entirely removed from the recess in the clutch-block, the bases of which are equal in cross-section to that of the body of the lever, which snugly fits the recess, and will thus remove the clutch-block from engagement with the teeth $t$ and permit the axle B to revolve independently of the gear-wheels D and D' until the lever I shall again be tripped by the cam $p$. The joint in the lever I relieves it of rigidity, whereby it offers no appreciable resistance to the operation of the spring $s$ in causing engagement of the clutch, which it will do each time a lug $t'$ passes the lug $m^3$ on the lever, whereby the jointed end of the latter is pressed backward, and with it, by means of the tapered projections $m$, the clutch-block E, against the tension of the spring $s$. The distance between the centers of each two lugs $t'$ is equal to the circumference of each pinion K, whereby the latter will be allowed to make a complete revolution after each engagement of a lug $t'$ with the lug $m^3$, since the jointed end of the lever I will not in its rise (which begins after each engagement with the lug $m^3$ of a lug $t'$) move the clutch-block E backward, owing to the sufficiently flexible nature of the joint.

As the machine requires to be turned after the planting of each double row in the manner hereinbefore described, to be driven back in planting an adjacent pair of parallel rows, the actuating medium or source of operation for the automatic and regular planting effect in the form of the flat wheel F requires to be raised from contact with the ground, since otherwise its continued rotation, if completed, would produce planting at undesired points, and, if uncompleted, would disorganize the regularity of its operation with relation to the points of deposit in the adjacent finished rows. To obviate this result, I provide means for raising and holding the flat wheel from contact with the ground and for returning the lug or cam $p$ back to the position it reaches immediately after having tripped the lever I, from which the flat wheel will have to make a complete revolution (by a run of three feet of the machine) before the lever I can again be tripped.

The means for raising and supporting in raised position the flat wheel comprises a lever, M, within easy reach from the driver's seat $k$, fulcrumed in the frame G of the machine, as shown in Figs. 1 and 2, and connected at its lower end to the flat-wheel device at a projection, $r^4$, upon the sleeve $r'$ by suitable means—such as a chain—as shown. The lever M is branched toward its lower extremity into a perforated segment, M', (see Fig. 5,) adjacent to the loose collar H', to engage with the teeth or peripheral projections $n'$ upon the same. Manipulation of the lever M will effect raising or lowering of the flat wheel, and when raised it may be retained in its elevated position by the hold of the operator or by other mechanical means of usual construction for similar purposes, (but not shown in this connection in the drawings,) to permit overcrowding of the figures to be avoided.

In raising the flat-wheel device the segmental branch M' of the lever M also raises and turns the loose collar H', to cause its projecting pin $n^2$ to enter the circular recess $p'$ in the head H and abut against the stop $x'$ therein, to turn the flat-wheel device back to a position at which the lug $p$ will be just behind the lever I, the raising of the collar H' being the result of the cam $m$ on its lower side in its engagement, while the collar is being turned, with the lower part of the housing Z. Of course, the lowering of the flat wheel is accomplished by the reverse motion of the mechanism just described, whereby the collar H' is also removed from engagement with the head H. In turning the machine, therefore, the lever M should be operated to raise the flat-wheel device, when the collar H' will be turned and raised, to cause the flat wheel F and its disk-carrying shaft F' to be reversed to a position which will return the lug $p$ to its starting-point after having tripped the lever I, whereby the driver can readily time himself as to the proper place at which again to lower the flat wheel.

The depth of penetration into the soil of the scoops L is controlled by a lever, N, within reach from the driver's seat, and provided with a spring-pawl device, $i$, to engage with the teeth of a curved rack, $i'$, having numbers upon it, as shown in Fig. 10, to indicate in inches the depth of such penetration, and the lower end of the lever is connected with a rock-shaft, N', suitably supported, and having secured upon it at each extremity a link, $h$, (see Fig. 8,) pivoted at its lower end to a bar, $h'$, carrying at its opposite extremity a pivoted link, $h^2$, having its lower end pivotally connected with a link, $h^3$, secured at one end upon the forward crank-shaped jointed axles, B', of the machine, which carry the front wheels, A'. By manipulating the lever N in one direction, the tongue O of course being supported, the forward wheels, A', are raised and the scoops L proportionately lowered by the falling of the axles B', or caused to penetrate deeper; and the reverse motion of the lever lowers the front wheels and raises the scoops in proportion.

The tongue O is pivoted to the machine to enable it to oscillate; or it may be rendered rigid by means which I provide for the purpose, comprising a rack, $f$, behind the pivotal point of the tongue, having its teeth parallel with the length of the tongue, a pin, $f'$, projecting through the socket or portion of the frame into which the tongue is inserted adjacent to the rack, and provided with a slanting or spiral recess, $f^2$, into which enters the lower enlarged end of a lever, P, fulcrumed in the tongue-socket. By manipulating the lever P the pin $f'$ is caused to engage with the rack, and thus render the tongue rigid, or is withdrawn from engagement with the rack to render the tongue swinging.

The marker ordinarily provided with machines of the present kind, and comprising a runner on the end of a rod extending from the side of the machine, may be removably secured in position upon the extensions $g$ of the axle or axles B', which are perforated, as shown in Fig. 9, to receive the bolts which serve to secure the marker in position. The marker should, of course, extend either three or four and one-half feet, depending upon whether a wheel A is to follow the line or whether the marker affords a guide below the center of the machine.

It is obvious that the tripping of the lever I may be effected more than once with each revolution of the flat wheel by arranging parts in proper relation and proportion to each other, and such modification is included in my invention.

What I claim as new, and desire to secure by Letters Patent, is—

1. In a seed-planter, a flat wheel connected with the machine, to be normally in contact with the ground, in combination with means, substantially as described, for causing the seed to be planted automatically at regular intervals, and actuated by the rotary movement of the flat wheel, produced by the locomotion of the machine, substantially as set forth.

2. In a seed-planter, the yielding flat wheel connected with the machine, to be normally in contact with the ground, in combination with means, substantially as described, for causing the seed to be planted at regular intervals, and actuated by the rotary movement of the flat wheel, produced by the locomotion of the machine, substantially as set forth.

3. In a seed-planter, a yielding flat wheel to be raised from and lowered to its normal position in contact with the ground, in combination with means, substantially as described, for causing the seed to be planted automatically at regular intervals, and actuated by the rotary movement of the flat wheel in frictional contact with the ground and produced by the locomotion of the machine, substantially as set forth.

4. In a seed-planter, a flat wheel connected with the machine, to be normally in contact with the ground and rotated by the locomotion of the machine, a lever in position to be tripped at one end by the flat wheel in its rotary movement, clutch mechanism, substantially as described, upon the main axle of the machine, controlled by the lever at its opposite end and released by the tripping of the latter to move into mesh, and means, substantially as described, actuated by the said clutch mechanism to effect the automatic planting of seed with each tripping of the lever by the rotation of the flat wheel, substantially as set forth.

5. In a seed-planter, a flat wheel connected with the machine, to be normally in contact with the ground and rotated by the locomotion of the machine, a lever in position to be tripped at one end by the flat wheel in its rotary movement, spring-clutch mechanism, substantially as described, upon the main axle of the machine, which is encircled by a loose sleeve carrying toward its opposite extremities a desired distance apart beveled gear-wheels provided centrally with clutch-teeth, the said spring-clutch mechanism being controlled by the said lever and released by the tripping of the same to mesh with the clutch-teeth upon the adjacent beveled gear-wheel and afford a rotary movement to the sleeve carrying the said gear-wheel, and means, substantially as described, connected with the said beveled gear-wheels and actuated by the rotary movement of the same to plant seed, substantially as set forth.

6. In a seed-planter, a flat wheel connected with the machine, to be normally in contact with the ground and rotated by the locomotion of the machine, a lever in position to be tripped by the flat wheel in its rotary movement, spring-clutch mechanism, substantially as described, upon the main axle of the machine, which is encircled by a loose sleeve carrying toward its opposite extremities a desired distance apart beveled gear-wheels provided centrally with clutch-teeth, the said spring-clutch mechanism being normally engaged by the said lever and released by the tripping of the same to mesh with the clutch-teeth upon the adjacent beveled gear-wheel and afford a rotary movement to the sleeve carrying the said gear-wheels, a beveled pinion in mesh with each gear-wheel and provided with a shaft carrying at its extremity a combined scoop and seed-chamber provided with means, substantially as described, for automatically supplying the seed, and actuated from the pinion by the rotary movement of the gear-wheel to effect planting, substantially as set forth.

7. In a seed-planter, a flat wheel, F, having a shaft, F', carrying at its upper extremity a cam-disk, H, and connected with the machine, to be normally in contact with the ground and rotated by the locomotion of the machine, a lever, I, in position to be tripped at one end by the cam-disk with each revolution of the flat wheel, clutch mechanism, substantially as described, upon the main axle of the machine, engaged by the lever at its opposite end and released by the tripping of the latter to move into mesh, and means, substantially as described, actuated by the said clutch mechanism to effect the automatic planting of seed with each tripping of the lever by the rotation of the flat wheel, substantially as set forth.

8. In a seed-planter, a flat wheel, F, connected with the machine, to be normally in contact with the ground, and provided with a housing, $F^2$, and carrying pivoted shoes $q$, in combination with means, substantially as described, for causing the seed to be planted automatically at regular intervals, and actuated by the rotation of the flat wheel, produced by the locomotion of the machine, substantially as set forth.

9. In a seed-planter, a flat wheel, F, having a shaft, F', carrying at its upper extremity a cam-disk, H, provided with a recess, $p'$, on its lower side, the flat wheel being connected with the machine, to be normally in contact with the ground and rotated by the locomotion of the machine, a lever, M, connected with the flat wheel, to permit raising and lowering of the same, and provided with a perforated segmental branch, M', a loose collar, H', supported on the shaft F' below the cam-disk H, having a projection, $n^2$, on its upper side, a cam, $o^2$, on its lower side, and peripheral projections $n'$, to be engaged by the segmental branch M' to raise the collar H', and thereby rotate the shaft F' and parts connected therewith and set the flat wheel, a lever, I, in position to be tripped at one end by the cam-disk with the revolution of the flat wheel, and means, substantially as described, actuated by the tripping of the lever to plant the seed, substantially as set forth.

10. In a seed-planter, a flat wheel connected with the machine, to be normally in contact with the ground and rotated by the locomotion of the machine, a lever, I, in position to be tripped at one end with each revolution of the flat wheel, and bent, as shown, toward its opposite end, and provided with a lug, $m^3$, wedge-shaped projections $m$, and pivot $m^2$, inserted into the frame of the machine, a spring, $s$, and a recessed clutch-block upon the main axle of the machine, to receive the lever I and projections $m$ thereon, a loose sleeve, C, surrounding the main shaft and carrying toward its opposite extremities the desired distance apart beveled gear-wheels D and D', cams $t'$ upon the gear-wheel D, to engage with the lug $m^3$ on the lever I, central clutch-teeth, $t$, upon the said gear-wheel, to be engaged by the clutch-block E with the tripping of the lever I, and thereby cause the rotary movement of the main axle to be imparted to the sleeve C, and means, substantially as described, connected with the gear-wheels D and D', and actuated by the rotary movement of the same to plant seed, substantially as described.

11. In a seed-planter, a rotary scoop, L, in combination with means, substantially as described, to rotate it at predetermined intervals, whereby it excavates soil and deposits it in the excavation, substantially as and for the purpose set forth.

12. In a seed-planter, a rotary scoop, L, provided with a seed-chamber, $l$, in combination with a feeding seed-box, L', communicating with the seed-chamber $l$, with the scoop in one position, but closed from such communication with the scoop in other positions, and means, substantially as described, to rotate the scoop at predetermined intervals, whereby it excavates soil, casts the seed, and deposits the soil in the excavation, substantially as and for the purpose set forth.

13. In a seed-planter having scoops L, actuated at predetermined intervals to plant seed, the combination, with the main axle B and axle B', carrying the wheels A', of a rock-shaft, N', actuated by a lever, N, engaging with a registering rack, $i'$, and intermediate connecting-links, to raise and lower the forward part of the machine, and thereby control the depth of penetration of the scoops, substantially as set forth.

PAUL DICKINSON.

In presence of—
  MASON BROSS,
  WM. SADLER.